United States Patent
Lan et al.

(10) Patent No.: US 6,754,902 B2
(45) Date of Patent: Jun. 22, 2004

(54) DRIVING MECHANISM FOR OPTICAL HEAD OF OPTICAL DISC DRIVER

(75) Inventors: Yung-Sung Lan, Hsinchu (TW); Ching-Hsing Huang, Hsinchu (TW); Chi-Lone Chang, Hsinchu (TW); Minsun Ouyang, Hsinchu (TW); Yu-Hsiu Chang, Hsinchu (TW); Tzuan-Ren Jeng, Hsinchu (TW); Jau-Jiu Ju, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 163 days.

(21) Appl. No.: 10/174,938

(22) Filed: Jun. 20, 2002

(65) Prior Publication Data
US 2003/0189889 A1 Oct. 9, 2003

(30) Foreign Application Priority Data
Apr. 3, 2002 (TW) ....................... 91106709 A

(51) Int. Cl.$^7$ ................................................ G11B 7/08
(52) U.S. Cl. ...................................................... 720/675
(58) Field of Search ......................................... 369/219

(56) References Cited

FOREIGN PATENT DOCUMENTS

| KR | 2002062038 A | * | 7/2002 | ............ G11B/7/09 |
| WO | WO 200293257 A2 | * | 11/2002 | ............ G03F/00/00 |

* cited by examiner

Primary Examiner—David Davis
(74) Attorney, Agent, or Firm—Birch, Stewart, Kolasch & Birch, LLP

(57) ABSTRACT

An optical head driving mechanism is applied to an optical disc driver that has a base plate, a pair of guide rods and an optical module movably mounted on the guide rods. The driving mechanism includes a base, a movable member, a piezo-actuator and at least a resilient member. The piezo-actuator and the movable member generate proceeding waves at the rim of the piezo-actuator and move the optical module along the guide rods when the piezo-actuator activates.

11 Claims, 8 Drawing Sheets

DRIVING MECHANISM FOR OPTICAL HEAD OF OPTICAL DISC DRIVER

BACKGROUND OF THE INVENTION

1. Field of the Invention

The invention generally relates to a driving mechanism of an optical disc driver, and particularly relates to a mechanism for driving an optical head of an optical disc driver, such as for compact disc, DVD, CD-R/RW, DVD-RW, DVD-RAM, MO, Mini Disk or Slim-type DVD.

2. Related Art

A conventional mechanism for driving an optical pickup head or writing head of an optical disc driver, as shown in FIG. 1, generally includes a base plate 1, an optical module 2 (including a writing or pickup head 21), motor and gears 3 and a rack 4. The optical module 2 is movably mounted on a pair of guide rods 11, 11'. The gears 3 are pivotally mounted on the base plate 1 at one side of the optical module 2. The rack 4 is connected to the optical module 2 and resiliently engaged with a part of the gears 3 by force of a pressing spring 41. When the motor and gears 3 drive, the rack and the optical module 2 is moved along the guide rack 11, 11'.

However, the aforesaid conventional diving mechanism has the following disadvantages:

1) The mechanism is complicated since there are many components;
2) It is hard to be minimized in size or made thinner since the components;
3) It is hard to improve the mechanism precision since there are larger tolerance in the motor, gears and rack;
4) It is higher in cost since there are so many components to be prepared and assembled.

Therefore, we need an optical head driving mechanism for an optical disc driver that has simpler composition, smaller and thinner size, higher precision and lower cost to overcome the aforesaid drawbacks.

SUMMARY OF THE INVENTION

The major object of the invention is to provide an optical head driving mechanism for an optical disc driver that has simple composition so as to reduce its size.

An optical head driving mechanism for an optical disc driver according to the invention is applied to an optical disc driver having a base plate, a pair of guide rods mounted on the base plate, and an optical module movably mounted on the guide rods. The optical module, including an optical head, is connected and driven by a driving mechanism. The driving mechanism includes a base, a movable member, a piezo-actuator and at least a resilient member. The base is fixed to the base plate. The movable member, having a plurality of first connection portions, is movably mounted on the base. The piezo-actuator, having a plurality of second connecting portions corresponding to the first connecting portions, contacts the optical module. The first connecting portions of movable member and the second connecting portions of the piezo-actuator connect to each other and act as reflection points of wave transference so as to provide proceeding waves at the rim of the piezo-actuator and move the optical module along the guide rods when the piezo-actuator activates. The resilient member is held by the base and the movable member so as to provide pressing force as suitable friction between the piezo-actuator and the optical module for transferring the proceeding waves.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

The invention provides an optical head driving mechanism for an optical disc driver. The driving mechanism has a simple composition that can easily reduce its dimensions, especially in the thickness.

Figure 1:
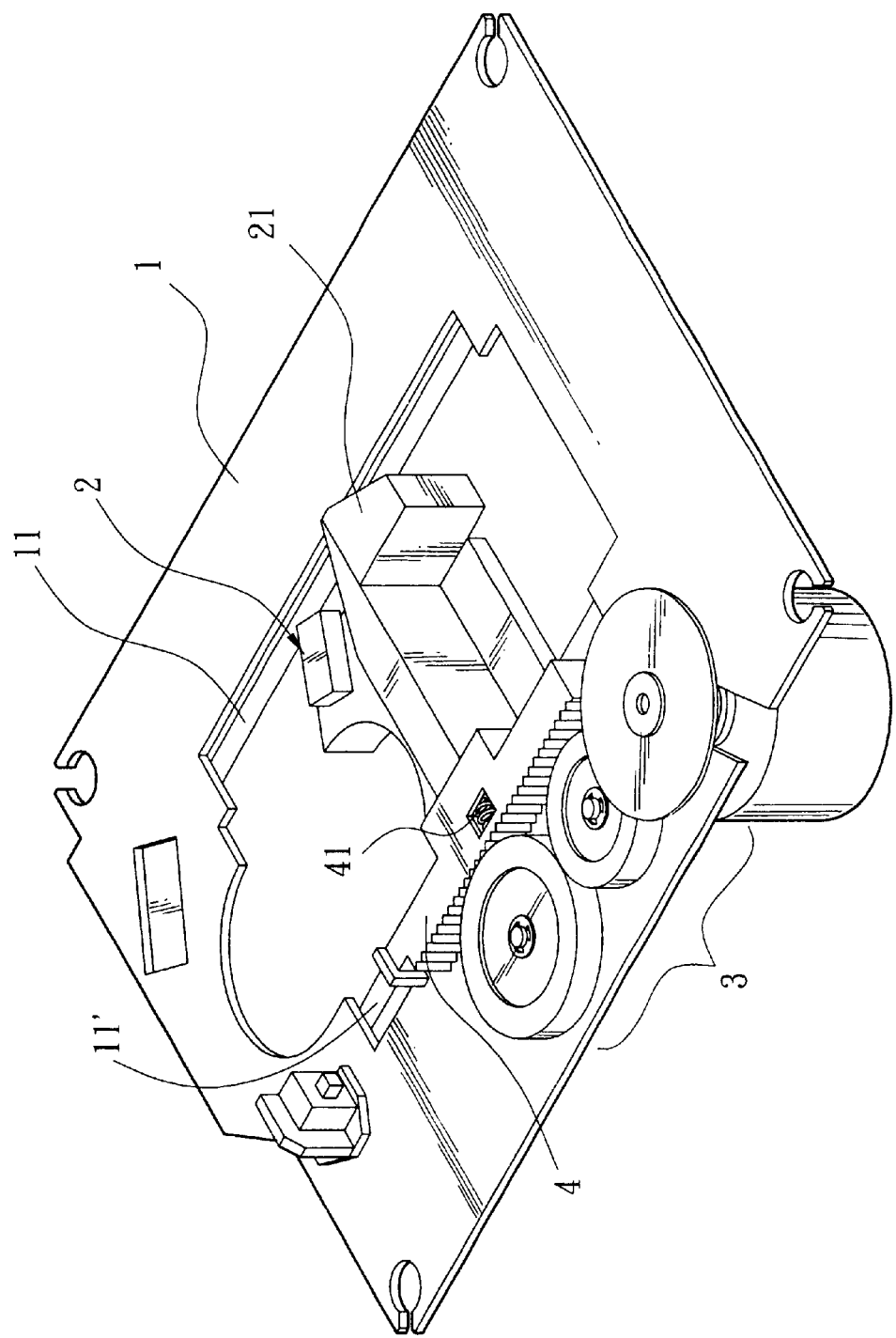
FIG. 1 is perspective view of a conventional optical head driving mechanism of an optical disc driver.
Figure 2A:
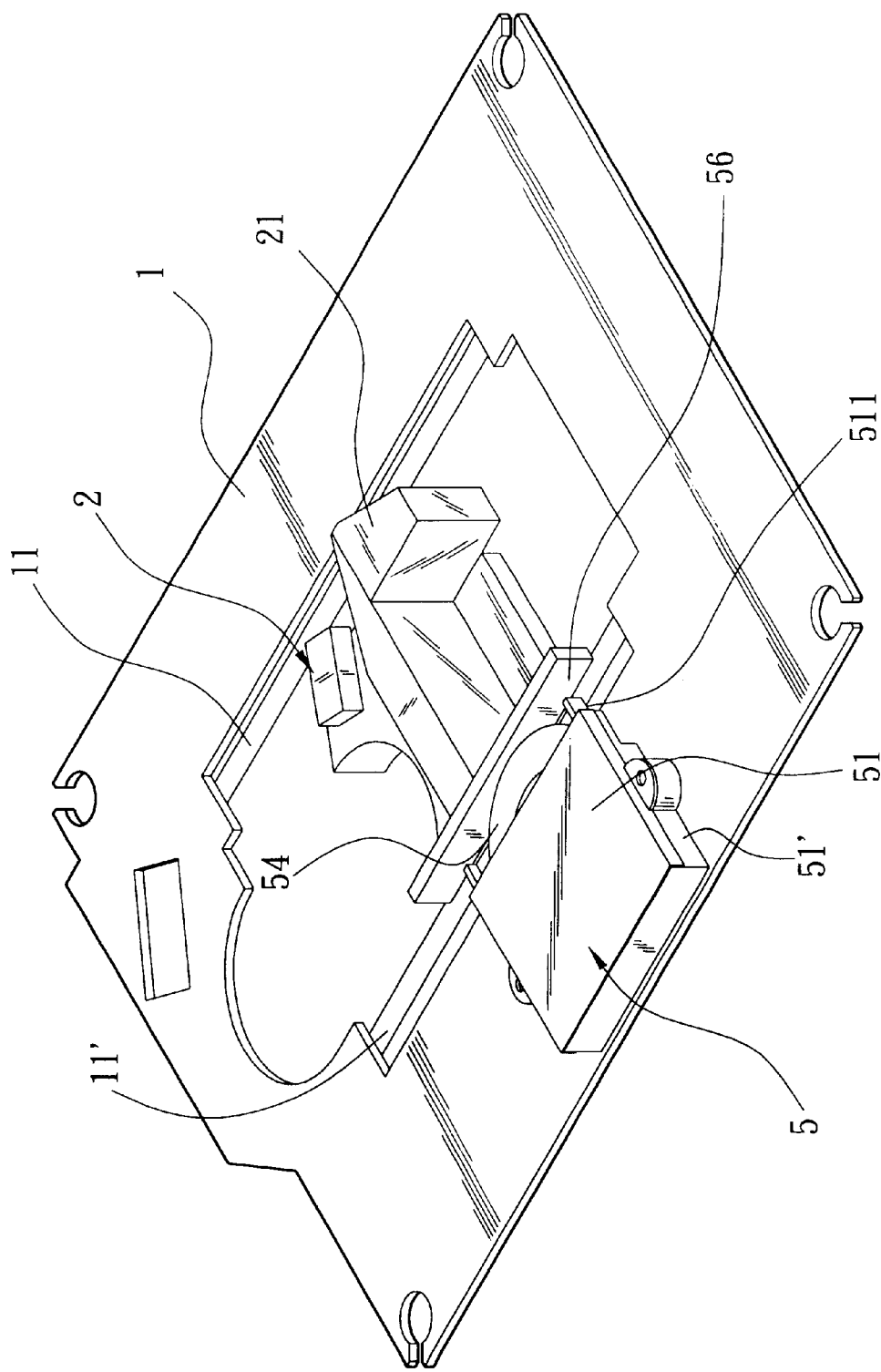
FIGS. 2A and 2B are operational views of an optical head driving mechanism according to the invention.
Figure 2B:
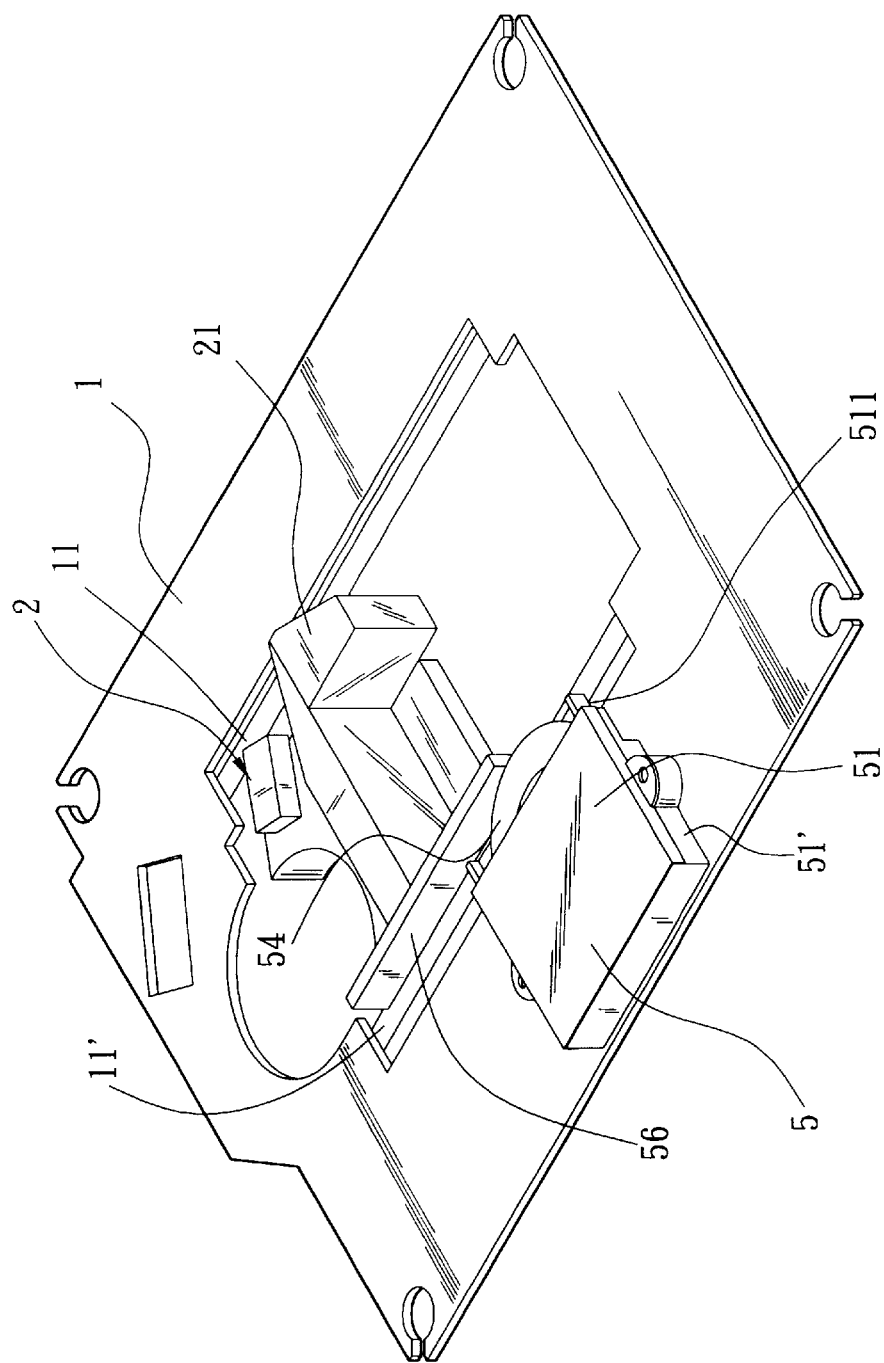
Figure 3:
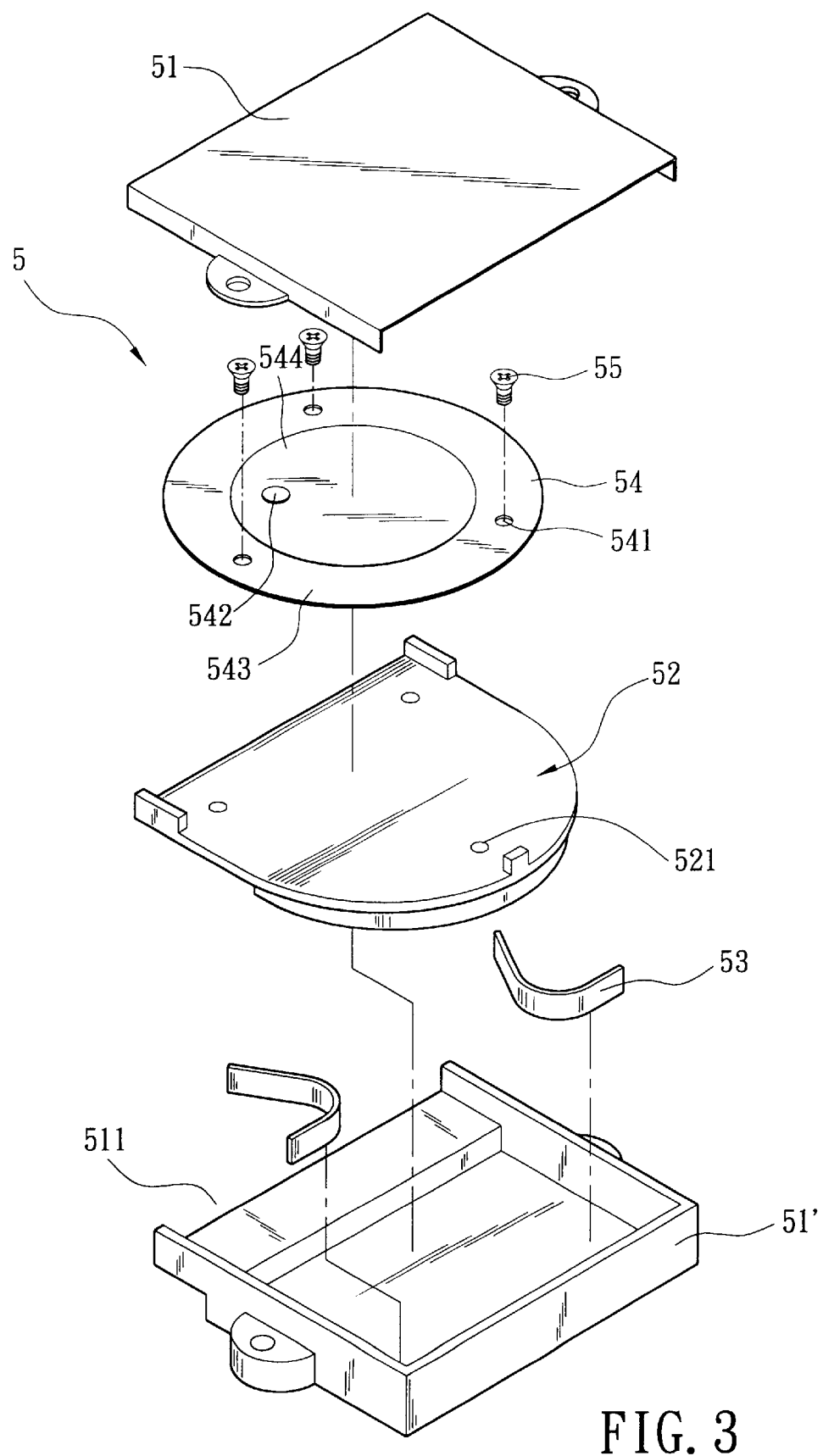
FIG. 3 is an exploded view of a driving mechanism of the invention.
Figure 4:
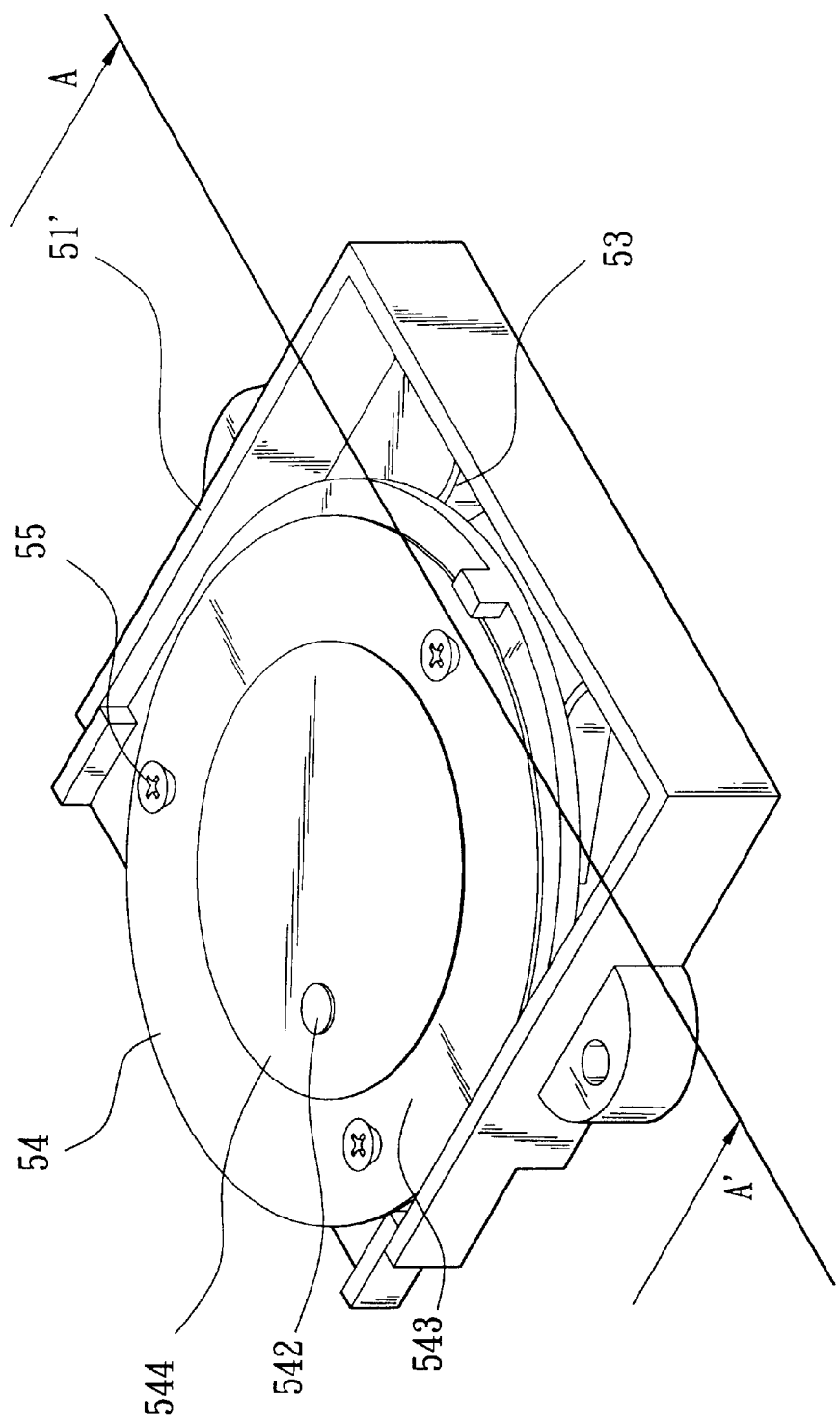
FIG. 4 is a perspective view of a partially assembled driving mechanism of the invention.
Figure 5:
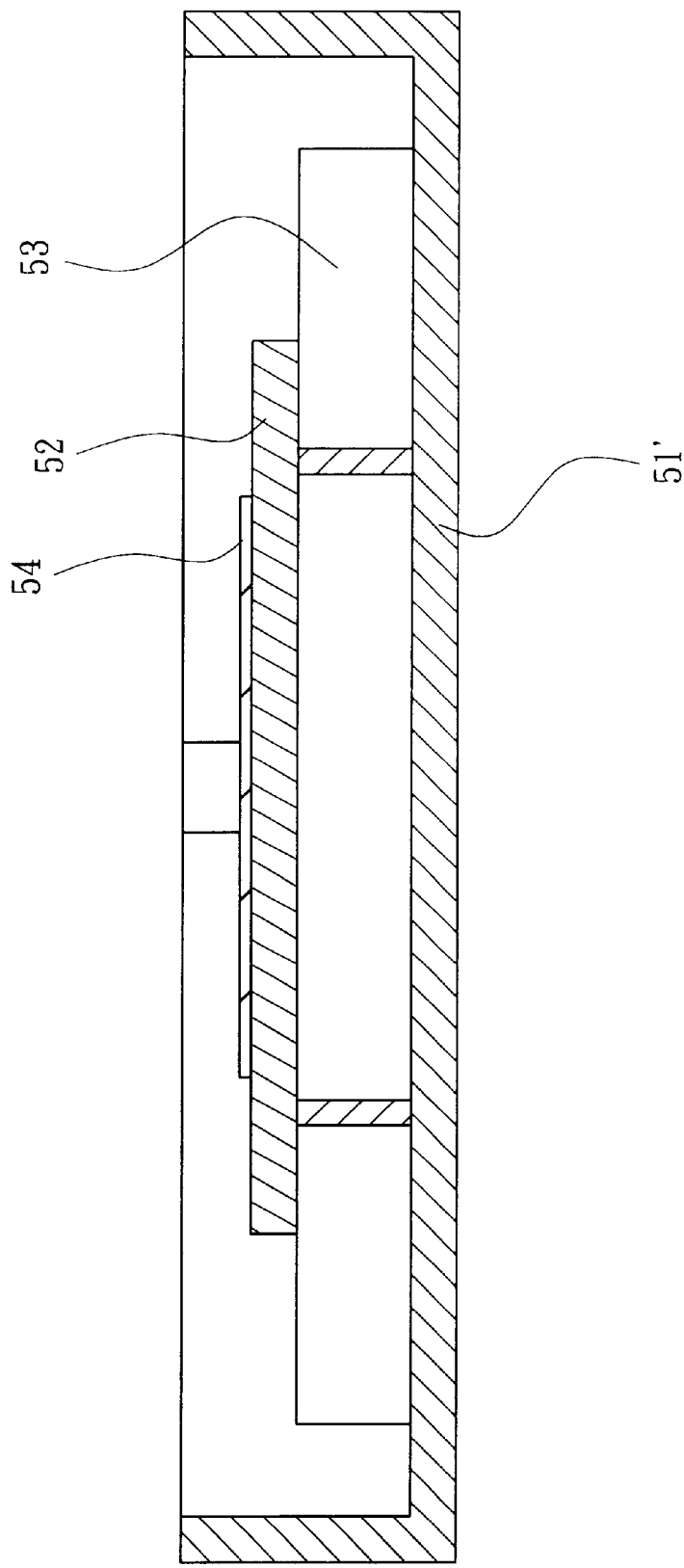
FIG. 5 is a sectional view taken from section A—A of FIG. 4.
Figure 6:
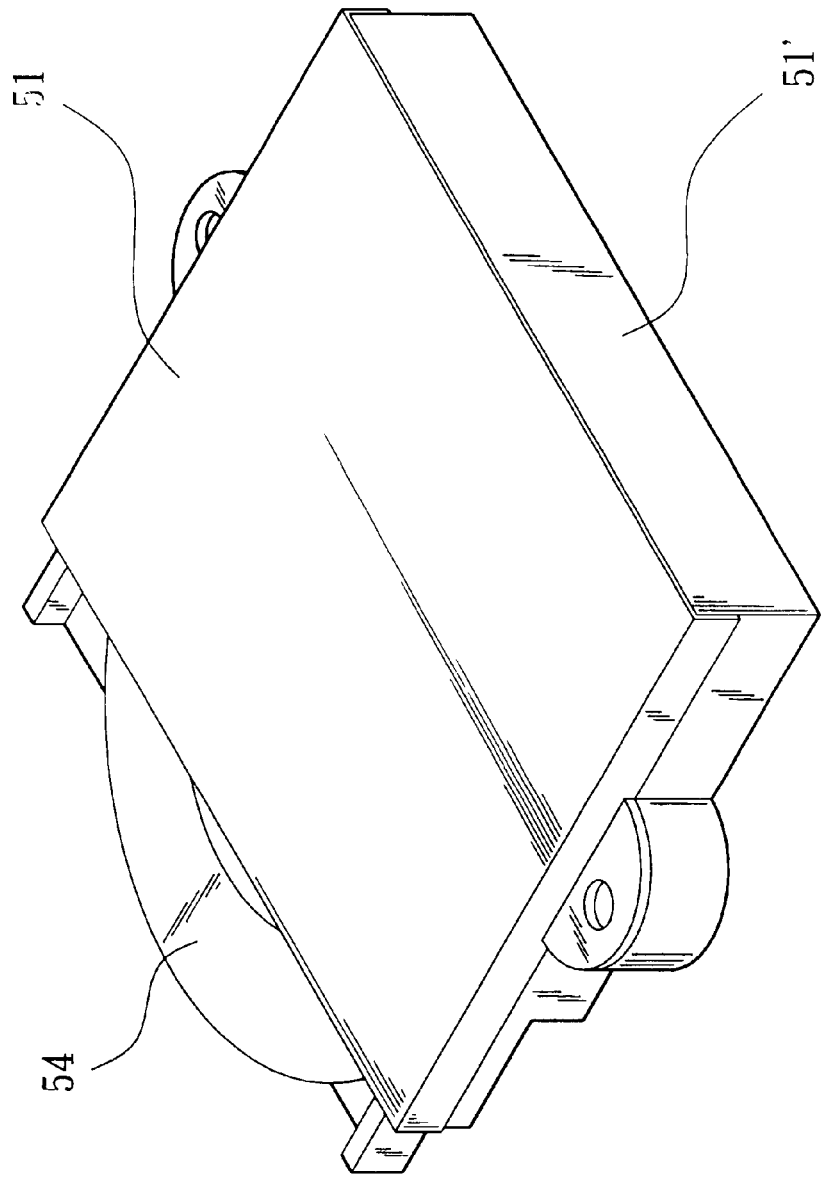
FIG. 6 is a perspective view of a driving mechanism of the invention.

As shown in FIGS. 2A and 2B, an optical head driving mechanism 5 for an optical disc driver according to the invention is applied to an optical disc driver having a base plate 1, a pair of guide rods 11, 11' mounted on the base plate 1, and an optical module 21 movably mounted on the guide rods 11, 11'. The optical module 2, including an optical head 21, is contacted and driven by the driving mechanism 5.

Also referring to FIGS. 2A, 2B, 3, 4, 5 and 6, the driving mechanism 5 includes a case, a movable member 52, resilient members 53, a piezo-actuator 54, fastening elements 55 and a friction member 56.

The case is fixed to the base plate 1 and composed of a cover 51 and a base 51' for containing the movable member 52, the resilient members 53, the piezo-actuator 54, and the fastening elements 55. An opening 511 is formed on one side of the case.

The movable member 52, having a plurality of first connecting portions 521 (such as screw holes shown in the drawing), is movably mounted on the base 51'.

The resilient members 53, such as resilient plates as shown or pressing springs (not shown), are held by the base 51' and the movable member 52 so as to provide pressing force as suitable friction between the piezo-actuator 54 and the optical module 2 for transferring proceeding waves.

The piezo-actuator 54 can be a self-excited type or an exteriorly excited type piezoelectric ceramic membrane that is activated by voltage input and provide displacement output. The piezo-actuator 54 is mounted in the case and extrudes outside the opening 511 for contact to the optical module 2. A plurality of second connecting portions (such as holes 541 shown in the drawing), corresponding to the first connecting portions, are formed on the piezo-actuator 54 for fastening elements 55 (such as screws) to pass through and fix the piezo-actuator 54 to the movable member 52.

The first connecting portions of the movable member and the second connecting portions of the piezo-actuator connect to each other and act as reflection points of wave transference so as to provide proceeding waves at the rim of the piezo-actuator and move the optical module along the guide rods when the piezo-actuator activates.

Figure 7B:
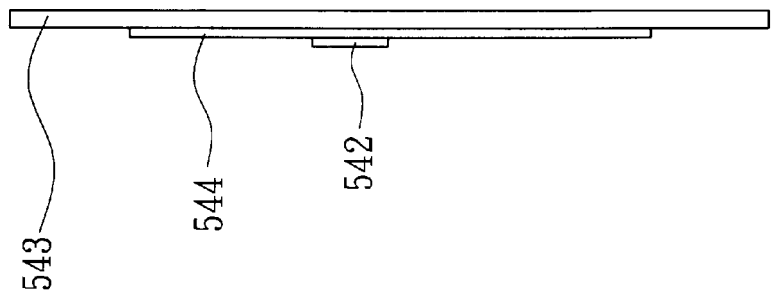
FIGS. 7A and 7B are front and side views of a piezo-actuator in the invention.
Figure 7A:
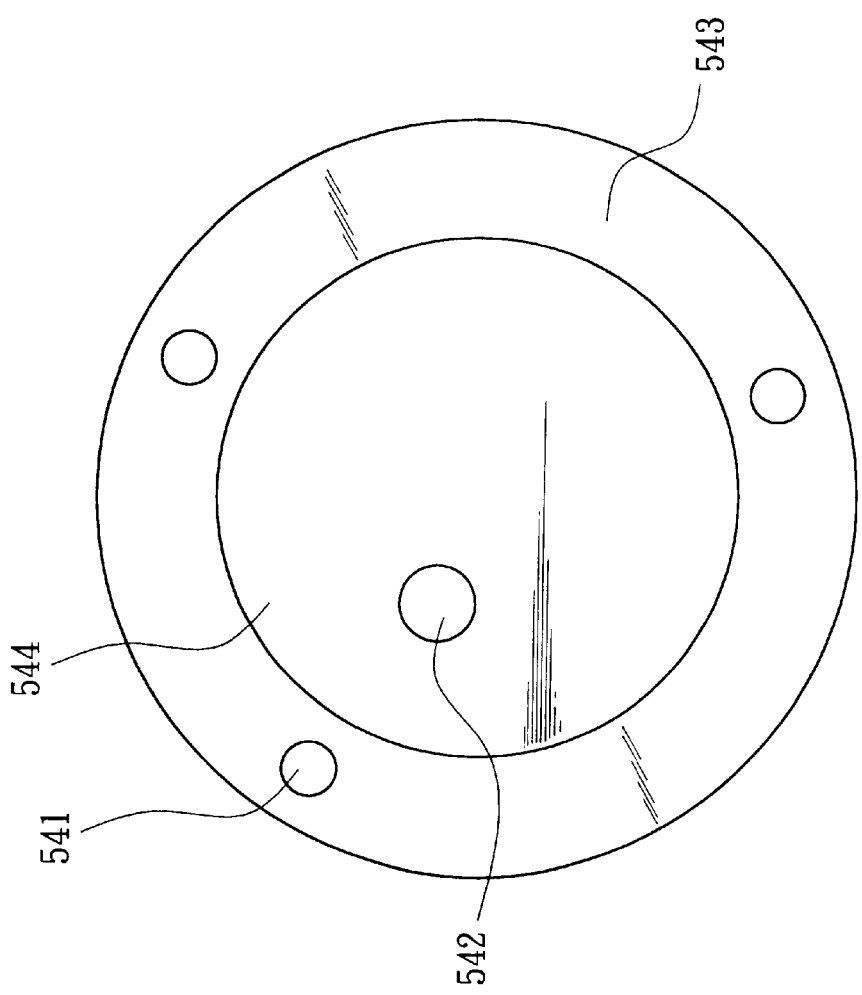

The piezo-actuator 54 is composed of a main electrode 542, a metallic (metal alloy) plate 543 and a piezo-ceramic membrane 544, as shown in FIGS. 7A, 7B. The main electrode 542 and the metallic plate 543 form two surfaces of the piezo-actuator 54 and enclose piezo-ceramic membrane 544 therein. When an electrical power is applied through the main electrode 542, the piezo-ceramic membrane 544 deforms and generates a mechanical wave to metallic plate 543. The mechanical wave reflects at the first and second connecting portions of the piezo-actuator 54 and the movable member 52. Repeated waves cause resonance of the piezo-actuator 54 and form proceeding waves at the rim of the piezo-actuator 54.

The friction member 56 is fixed on the optical module 2 and contacted with the rim of the piezo-actuator 54. As shown in FIGS. 2A and 2B, when alternating current is applied to the piezo-actuator 54, the proceeding waves formed at the rim thereof push the optical module 2 moving along the guide rods 11, 11'. Meanwhile, the resilient members 53 provide pressing force to the movable member 52 so that a suitable friction force is applied between the rim of the piezo-actuator 54 and the surface of the friction member 56. Therefore, the optical module 2 is driven by the proceeding waves. The driving mechanism 5 uses a few components that it is easy for us to minimize the size or thickness of the whole device.

Of course, by changing the frequency of the alternating current, the proceeding waves caused by resonance of the piezo-actuator 54 can be controlled with different proceeding directions for moving the optical module 2 in different directions along the guide rods 11, 11', As described above, the optical head diving mechanism according to the invention has the following advantages:

1) The mechanism is simple and uses less components;
2) It is easy to be minimized in size or made thinner since the less components;
3) It is easy to improve the mechanism precision since the movement is only controlled through frequency of the electrical power;
4) It is lower in cost since there are only a few components to be prepared and assembled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical head driving mechanism, applied to an optical disc driver having a base plate, a pair of guide rods mounted on said base plate, and an optical module having an optical head movably mounted on said guide rods, comprising:

a base, fixed to said base plate;

a movable member, movably mounted on said base, and having a plurality of first connecting portions;

a piezo-actuator, contacted with said optical module, and having a plurality of second connecting portions corresponding to said first connecting portions, said first and second connecting portions connect to each other and act as reflection points of wave transference so as to provide proceeding waves at rim of said piezo-actuator and move said optical module along said guide rods when said piezo-actuator activates; and at least a resilient member held by said base and said movable member for providing pressing force as suitable friction between said piezo-actuator and said optical module for transferring said proceeding waves.

2. An optical head driving mechanism according to claim 1 wherein said piezo-actuator is selected form the group consisting of self-excited type and exteriorly excited type piezoelectric ceramic membranes.

3. An optical head driving mechanism according to claim 1 wherein said piezo-actuator is composed of a main electrode, a metallic plate and a piezo-ceramic membrane, said main electrode and said metallic plate form two surfaces of said piezo-actuator and enclose said piezo-ceramic membrane therein so that when an electrical power is applied through said main electrode, said piezo-ceramic membrane deforms and generates a mechanical wave to said metallic plate.

4. An optical head driving mechanism according to claim 3 wherein said metallic plate is made of metal alloy.

5. An optical head driving mechanism according to claim 1 further comprising a friction member fixed to said optical module and contact with said piezo-actuator.

6. An optical head driving mechanism according to claim 1 further comprising a cover fixed to said base and forms a case.

7. An optical head driving mechanism according to claim 1 wherein said base is formed with an opening for said piezo-actuator to extrude outward and contact said optical module.

8. An optical head driving mechanism according to claim 1 wherein said second connecting portions of said piezo-actuator are holes, said first connecting portions of said movable member are fastening holes, for fastening elements pass through said holes and fastening holes to fasten said piezo-actuator to said movable member.

9. An optical head driving mechanism according to claim 8 wherein said first connecting portions of said movable member are screw holes, and said fastening elements are screws.

10. An optical head driving mechanism according to claim 1 wherein said resilient member is a resilient plate.

11. An optical head driving mechanism according to claim 1 wherein said resilient member is a spring.

* * * * *